March 14, 1933.  E. G. GLOVER  1,901,744
NUT LOCK
Filed Aug. 28, 1929
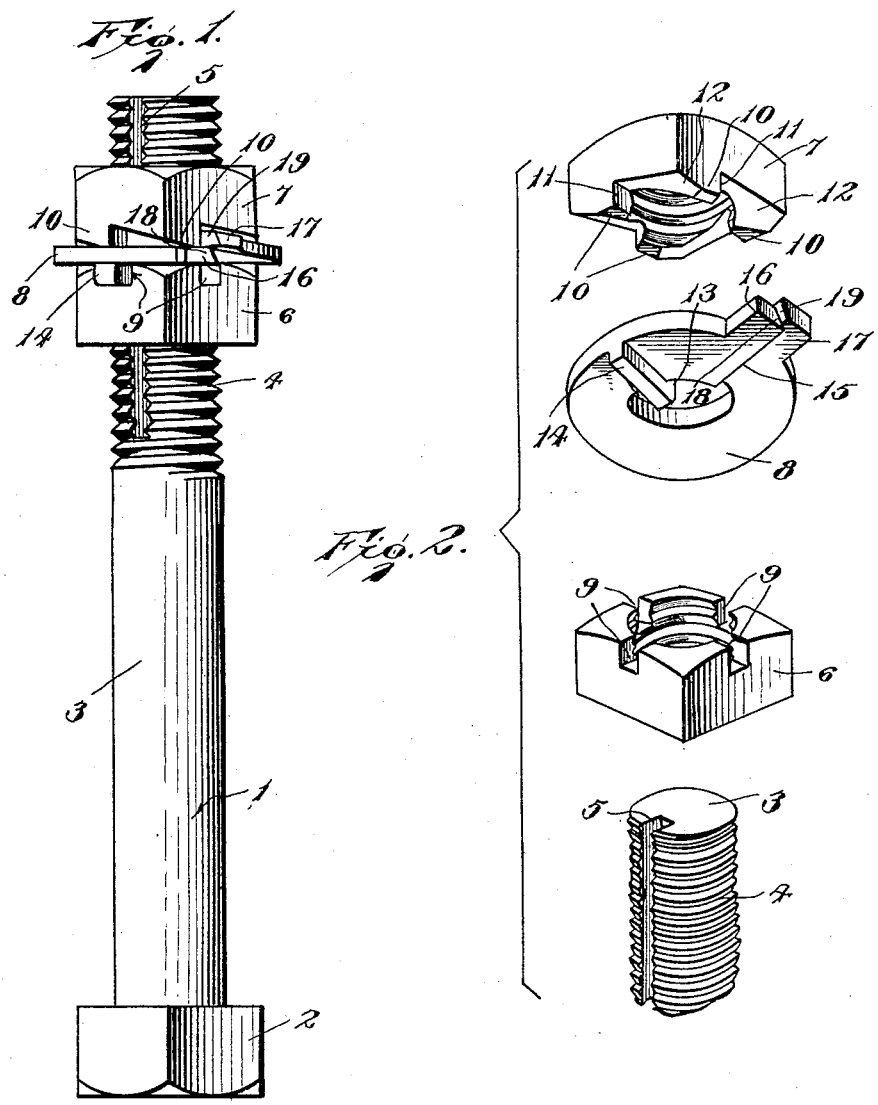

Patented Mar. 14, 1933

1,901,744

UNITED STATES PATENT OFFICE

EDWARD GILMER GLOVER, OF PINEVILLE, NORTH CAROLINA

NUT LOCK

Application filed August 28, 1929. Serial No. 389,034.

This invention relates to nut locks, and one object of the invention is to provide a nut lock including a bolt and nuts which may be tightened as much as desired and securely but releasably held in a set position.

Another object of the invention is to so form the securing nuts and a locking washer for the same that a single washer may be employed to secure both of the nuts in a set position and at the same time allow an inner nut to be moved by an outer nut into position to cause the threads of the inner nut to be bound tightly against the threads of the bolt carrying the two nuts.

Another object of the invention is to provide a nut lock consisting of a comparatively few number of parts all of which are strong and durable and not liable to get out of order or break.

The invention is illustrated in the accompanying drawing, wherein

Figure 1 is a view showing the improved nut lock in side elevation,

Fig. 2 is a perspective view showing a portion of the shank of the bolt and the two nuts and securing washer, and Fig. 3 is a longitudinal sectional view through the shank of the bolt with the nuts and securing washer in place.

The bolt, which is indicated in general by the numeral 1, is formed with a head 2 at one end of its shank 3 and the free end portion of the shank is threaded, as shown at 4, and formed with a longitudinally extending groove 5 which is of greater depth than the threads.

Inner and outer nuts 6 and 7 are screwed upon the threaded shank and between these nuts is disposed a locking washer 8 formed of resilient metal. The nut 6 has its walls formed with recesses or seats 9 which extend radially from the bore of the nut and while this nut has been shown formed with four recesses or seats it will be understood that as many as desired may be provided. The inner face of the outer nut 7 is shaped to define teeth 10, four of which have been shown in the drawing, although additional teeth may be provided and each of these teeth is formed with a straight cut front face 11 and a sloping face 12 leading from the end of the tooth to the straight cut front face of an adjacent tooth and constituting a cam surface.

The locking washer 8 fits about the shank of the bolt between the two nuts and is formed with an inwardly extending lug 13 adapted to fit into the groove or seat 5 of the shank and across the inner or under surface of the washer extends a rib 14 having its inner end merging into the lug, as shown in Fig. 3. This rib is adapted to fit into any one of the recesses 9 of the nut 6, and from an inspection of Fig. 3 it will be readily seen that when the washer is set in place upon the shank of the bolt it will be held against turning by the lug and rib fitting into the groove 5 and the rib by fitting into one of the recesses 9. This arrangement will very effectively prevent the nut from turning about the bolt. Therefore, the nut 6 may be tightened as much as desired and the washer will retain it in a set position.

After the washer has been set in place, the outer nut 7 which may be referred to as a jam nut is screwed upon the bolt and the teeth 10 will bear against the washer. An extension is formed upon the washer which projects radially therefrom and intermediate the width of this extension the washer is split radially, as shown at 15, thereby forming a split washer and dividing the side extension into arms 16 and 17. It should be noted that the slit is cut diagonally, as clearly shown in Figs. 1 and 2, and, therefore, the arms 16 and 17 and the corresponding ends of the split washer will be formed with beveled faces 18 and 19 and the face 19 will overlie the face 18. By this arrangement the arm 17 and corresponding end of the split washer may spring upwardly or outwardly and constitute a tooth adapted to be pressed inwardly by the cam surfaces 12 as the outer nut 7 is tightened and after one of the teeth 10 has passed the outwardly sprung end of the washer engage the tooth of the nut against the straight cut front face 10 thereof and very effectively prevent the outer nut from working loose. Therefore, the outer nut may be secured in a set position and exert pressure against the washer and inner nut to force the inner nut inwardly and cause its threads to bind against the threads of the bolt. When it is necessary to remove the bolt, a wrench is engaged with the outer nut in the usual manner and may exert pressure against the outwardly sprung end of the washer. This will cause the yieldable end of the washer to be forced inwardly until it is flush with the other end of the washer and the outer nut can then be very easily loosened. If so desired, a clamp may be applied to the two arms and tightened until the outwardly sprung end of the washer is flush with its other end or the free end of the washer may be held in an inoperative position in any other manner desired.

Having thus described the invention, I claim:

A nut lock comprising a bolt having a threaded shank formed with a longitudinally extending groove, a nut threaded upon said shank and having its outer face formed with radiating seats, a locking washer fitted about said shank against said nut and formed on its lower face with a radial rib to fit in a seat of the nut and an integral lug extending longitudinally of its bore to seat in the groove of the bolt to secure the nut in a set relation to the bolt, a tongue extending radially from said washer, the washer being split radially intermediate the width of the tongue to provide spring arms the opposed faces of which are beveled and are smooth and straight to form a lap joint throughout their entire length, one of said arms springing outwardly and the outer corner of its beveled edge forming a tooth, and a second nut screwed upon said shank and having its inner face formed with teeth, each having a straight cut radial front face and a sloping face leading from the end of the tooth to the straight cut face of an adjacent tooth and constituting a cam surface whereby the teeth of the second nut may flatten the spring arm of the washer and pass over the same into position to prevent retrograde rotation of the second nut when tightened, the side faces of the arms being parallel and said arms projecting outwardly from the nut a sufficient distance to be grasped under pressure to release the second nut.

In testimony whereof I affix my signature.

EDWARD GILMER GLOVER. [L. S.]